United States Patent
Prasad et al.

(10) Patent No.: US 11,581,841 B2
(45) Date of Patent: Feb. 14, 2023

(54) ELECTRICAL SYSTEM HAVING BOOST CONVERTER FUNCTIONALITY

(71) Applicant: GM Global Technology Operations LLC, Detroit, MI (US)

(72) Inventors: Rashmi Prasad, Troy, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 191 days.

(21) Appl. No.: 17/208,160

(22) Filed: Mar. 22, 2021

(65) Prior Publication Data

US 2022/0302867 A1    Sep. 22, 2022

(51) Int. Cl.
| | |
|---|---|
| H02P 27/08 | (2006.01) |
| B60L 50/60 | (2019.01) |
| B60K 6/28 | (2007.10) |
| H02M 7/5387 | (2007.01) |
| B60L 53/24 | (2019.01) |
| B60L 53/53 | (2019.01) |
| B60L 53/14 | (2019.01) |

(52) U.S. Cl.
CPC .............. *H02P 27/08* (2013.01); *B60L 50/60* (2019.02); *H02M 7/53871* (2013.01); *B60K 6/28* (2013.01); *B60L 53/14* (2019.02); *B60L 53/24* (2019.02); *B60L 53/53* (2019.02); *B60L 2210/44* (2013.01); *B60Y 2200/91* (2013.01); *B60Y 2200/92* (2013.01); *B60Y 2400/61* (2013.01); *H02P 2201/09* (2013.01)

(58) Field of Classification Search
CPC ....... H02P 27/08; H02P 2201/09; B60K 6/28; B60L 50/60; B60L 53/24; B60L 2210/40; B60L 2210/44; H02M 7/53871; B60Y 2200/91; B60Y 2400/61
See application file for complete search history.

(56) References Cited

U.S. PATENT DOCUMENTS

| | | | |
|---|---|---|---|
| 4,588,933 A * | 5/1986 | Sun ........................... | H02P 6/34 318/434 |
| 6,909,201 B2 | 6/2005 | Murty et al. | |
| 7,919,949 B2 | 4/2011 | Namuduri et al. | |
| 8,432,126 B2 | 4/2013 | Hasan et al. | |
| 8,606,447 B2 | 12/2013 | Namuduri et al. | |

(Continued)

FOREIGN PATENT DOCUMENTS

CN            111347893 A        6/2020

*Primary Examiner* — Thai T Dinh
(74) *Attorney, Agent, or Firm* — Vivacqua Crane, PLLC

(57) ABSTRACT

An electrical system can include a rechargeable energy storage system (RESS) and a power inverter connected to the RESS. The power inverter can be configured to provide electrical power to a traction motor. The electrical system includes a plurality of machine windings connected between a plurality of first switches and the traction motor. Each switch of the plurality of first switches is configured to transition between a closed state to allow current flow between the power inverter and the traction motor. The electrical system includes a plurality of inductor windings connected between a plurality of second switches and an off-board power source. Each switch of the plurality of second switches is configured to transition between a closed state to allow current flow between the off-board power source and the power inverter to charge the RESS.

20 Claims, 6 Drawing Sheets

(56) References Cited

U.S. PATENT DOCUMENTS

| | | |
|---|---|---|
| 9,118,210 B2 | 8/2015 | Namuduri et al. |
| 9,153,974 B2 | 10/2015 | Reynolds et al. |
| 9,387,766 B2 | 7/2016 | Hao et al. |
| 9,452,672 B2 | 9/2016 | Namuduri et al. |
| 9,573,454 B2 | 2/2017 | Holmes et al. |
| 9,621,099 B1 * | 4/2017 | Namuduri ............. H02K 21/14 |
| 9,657,705 B2 | 5/2017 | Holmes et al. |
| 9,868,410 B2 | 1/2018 | Namuduri et al. |
| 9,882,521 B2 | 1/2018 | Namuduri et al. |
| 9,973,028 B2 | 5/2018 | Namuduri et al. |
| 10,189,470 B2 | 1/2019 | Atluri et al. |
| 10,259,448 B2 | 4/2019 | Bucknor et al. |
| 10,369,900 B1 | 8/2019 | Conlon |
| 10,432,130 B2 | 10/2019 | Namuduri et al. |
| 10,605,217 B2 | 3/2020 | Namuduri et al. |
| 10,917,030 B1 * | 2/2021 | Hao ..................... H02K 3/28 |
| 2008/0173017 A1 | 7/2008 | James |
| 2009/0184681 A1 | 7/2009 | Kuno |
| 2010/0188071 A1 | 7/2010 | Kajouke |
| 2012/0306424 A1 * | 12/2012 | Naik ...................... H02P 25/18 |
| | | 318/495 |
| 2014/0239876 A1 * | 8/2014 | Hao ..................... H02P 25/188 |
| | | 318/724 |
| 2016/0152153 A1 | 6/2016 | Yang et al. |
| 2016/0185225 A1 | 6/2016 | Namuduri et al. |
| 2018/0050686 A1 | 2/2018 | Atluri et al. |
| 2018/0351398 A1 | 12/2018 | Tang et al. |
| 2019/0160953 A1 | 5/2019 | Namuduri et al. |
| 2019/0255953 A1 | 8/2019 | Conlon |
| 2021/0044135 A1 | 2/2021 | Lee et al. |
| 2022/0297555 A1 | 9/2022 | Prasad et al. |
| 2022/0297557 A1 | 9/2022 | Prasad et al. |
| 2022/0302835 A1 | 9/2022 | Prasad et al. |
| 2022/0302836 A1 | 9/2022 | Prasad et al. |

* cited by examiner

ELECTRICAL SYSTEM HAVING BOOST CONVERTER FUNCTIONALITY

INTRODUCTION

The present disclosure relates to relates to a vehicle electrical system having boost conversion functionality.

A hybrid electric or battery electric vehicle transmission typically includes one or more high-voltage polyphase electric machines in the form of a motor generator unit or an electric traction motor. Electric machines deliver/charge power to or draw power from a rechargeable direct current (DC) battery pack. The energized electric machines adjust torques of the various gear sets of the transmission to achieve optimal system efficiency. A DC boost converter is typically used to increase the battery output voltage to a level suitable for use by the electric machines.

Semiconductor switches of a power inverter module are controlled via pulse-width modulation or other switching control signals to convert the boosted battery output voltage to an alternating current (AC) output voltage. The AC output voltage from the power inverter module is ultimately transmitted to the individual phase windings of the electric machine. The energized electric machine powers the drivetrain of the vehicle.

SUMMARY

An example electrical system is disclosed. The electrical system can include a rechargeable energy storage system (RESS) and a power inverter connected to the RESS. The power inverter can be configured to provide electrical power to a traction motor. The electrical system includes a plurality of machine windings connected between a plurality of first switches and the traction motor. Each switch of the plurality of first switches is configured to transition between a closed state to allow current flow between the power inverter and the traction motor and an open state to prevent current flow between the power inverter and the traction motor. The electrical system includes a plurality of inductor windings connected between a plurality of second switches and an off-board power source. Each switch of the plurality of second switches is configured to transition between a closed state to allow current flow between the off-board power source and the power inverter to charge the RESS and an open state to prevent current flow between the off-board power source and the power inverter.

In other features, each winding of the plurality of machine windings comprise windings of the traction motor.

In other features, each winding of the plurality of inductor windings are disposed about a common magnetic core.

In other features, each winding of the plurality of inductor windings are disposed about a different magnetic core.

In other features, the power inverter comprises a set of semiconductor switches that are configured to convert direct current (DC) power to alternating current (AC) power.

In other features, each semiconductor switch of the set of semiconductor switches comprises a voltage-controlled switching device.

In other features, the voltage-controlled switching device comprises at least one of a silicon insulated gate bipolar transistor (IGBT), a silicon carbide metal-oxide semiconductor field effect transistor (MOSFET), a silicon superjunction MOSFET, a Gallium nitride (GaN) field-effect transistor (FET), a SiC junction-gate field-effect transistor (JFET), a wideband-gap (WBG) device, or an ultra-wideband-gap device (UWBG).

In other features, the power inverter comprises a plurality of phase legs, each phase leg of the plurality of phase legs comprising a pair of semiconductor switches of the set of semiconductor switches, wherein each phase leg selectively connects to a corresponding machine winding of the plurality of machine windings or a corresponding inductor of the plurality of inductors.

In other features, at least one semiconductor switch of a first phase leg and a second phase leg are pulse-width modulated to allow current flow through at least one of the first phase leg and the second phase leg.

In other features, current flows through at least two inductor windings of the plurality of inductor windings to increase a voltage from the off-board power source from a first voltage to a second voltage.

An example electrical system is disclosed. The electrical system can include a rechargeable energy storage system (RESS) and a power inverter connected to the RESS. The power inverter can be configured to provide electrical power to a traction motor. The electrical system includes a plurality of machine windings connected between a plurality of first switches and the traction motor. Each switch of the plurality of first switches is configured to transition between a closed state to allow current flow between the power inverter and the traction motor and an open state to prevent current flow between the power inverter and the traction motor. The electrical system includes a plurality of inductor windings connected between a plurality of second switches and an off-board power source. Each switch of the plurality of second switches is configured to transition between a closed state to allow current flow between the off-board power source and the power inverter to charge the RESS and an open state to prevent current flow between the off-board power source and the power inverter. The electrical system includes a controller connected to the plurality of first switches, the plurality of second switches, a power inverter controller. The controller is configured to transmit control signals to the plurality of first switches, the plurality of second switches, and the power inverter controller to allow current flow between the off-board power source and the power inverter to charge the RESS during a charging operation.

In other features, each winding of the plurality of machine windings comprise windings of the traction motor.

In other features, each winding of the plurality of inductor windings are disposed about a common magnetic core.

In other features, each winding of the plurality of inductor windings are disposed about a different magnetic core.

In other features, the power inverter comprises a set of semiconductor switches that are configured to convert direct current (DC) power to alternating current (AC) power.

In other features, each semiconductor switch of the set of semiconductor switches comprises a voltage-controlled switching device, wherein the voltage-controlled switching device comprises at least one of a silicon insulated gate bipolar transistor (IGBT), a silicon carbide metal-oxide semiconductor field effect transistor (MOSFET), a silicon superjunction MOSFET, a Gallium nitride (GaN) field-effect transistor (FET), a SiC junction-gate field-effect transistor (JFET), a wideband-gap (WBG) device, or an ultra-wideband-gap device (UWBG).

In other features, the power inverter comprises a plurality of phase legs, each phase leg of the plurality of phase legs comprising a pair of semiconductor switches of the set of semiconductor switches, wherein each phase leg selectively connects to a corresponding machine winding of the plurality of machine windings or a corresponding inductor of the plurality of inductors.

In other features, the controller receives software updates via over-the-air programming.

In other features, the controller is configured to transmit control signals to control the current flow to achieve the desired charging power in boost converter mode.

A method is disclosed that includes determining whether a connection with an off-board power source has been established. The method also includes transmitting at least one control signal to a power inverter and to at least a first switch to prevent current flow between the power inverter and a plurality of machine windings of a traction motor and to at least a second switch to allow current flow between the off-board power source through a plurality of inductor windings to a rechargeable energy storage system (RESS) during a charging operation.

In other features, the plurality of inductor windings and the plurality of switches at an output of the inverter are disposed within at least one of the RESS or the power inverter.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Some hybrid electric or battery electric vehicles may include native onboard rechargeable energy storage systems (RESS) that store voltage that is greater than a voltage available to charge the vehicle's RESS. In these instances, the vehicle may require an additional DC-DC converter to step up voltage from an off-board power source to the RESS during charging. Additional DC-DC converters can result in an increase in cost, mass, and volume of the vehicle.

The present disclosure describes an electrical system that provides boost converter functionality via inverter switches and a set of inductor windings. For example, a controller, such as an inverter controller, can selectively transition one or more switches from an open state to a closed state, or vice versa, to cause electrical power to be directed from an off-board power source to the RESS. The electrical power can be directed through one or more of the inductor windings through an inverter such that the voltage is stepped up relative to the voltage of the off-board power source.

Figure 1A:
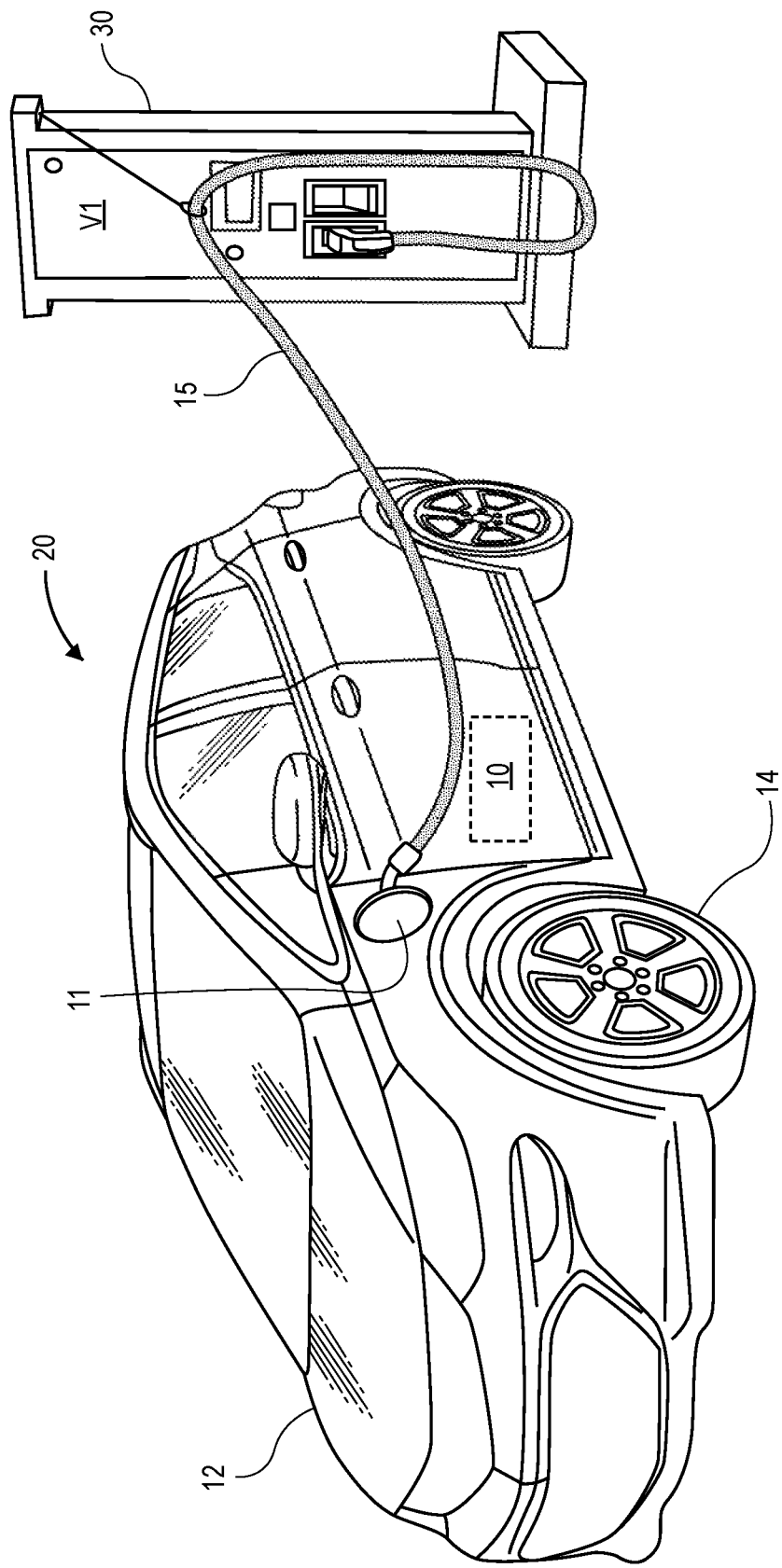
FIG. 1A is a schematic illustration of an example motor vehicle connected to an off-board DC fast-charging station.

FIG. 1A illustrates an example direct current (DC) charging circuit 10 as part of a motor vehicle 20. The vehicle 20 is depicted as undergoing a DC fast-charging operation in which the DC charging circuit 10 is electrically connected to an off-board DC fast-charging station 30 via a charging port 11 and a charging cable 15, e.g., using an SAE J1772 charge connector, CHAdeMO, or another suitable regional or national standard charging plug or connector. The present teachings are independent of the particular charging standard that is ultimately employed in a DC fast-charging operation involving the DC fast-charging station 30, and thus the above-noted examples are merely illustrative.

The DC charging circuit 10 may be used as part of the motor vehicle 20, as well as other electrical systems such as stationary or mobile power plants robots or platforms. For vehicular applications, non-motor vehicles such as aircraft, marine vessels, and rail vehicles may enjoy similar benefits. The DC charging circuit 10 may be Fused as part of a powertrain of a mobile system, such as the example vehicle 20. For illustrative consistency, an application of the DC charging circuit 10 as an integral part of the vehicle 20 in a motor vehicle context will be described hereinafter without limiting the present disclosure to such an implementation.

Figure 1B:
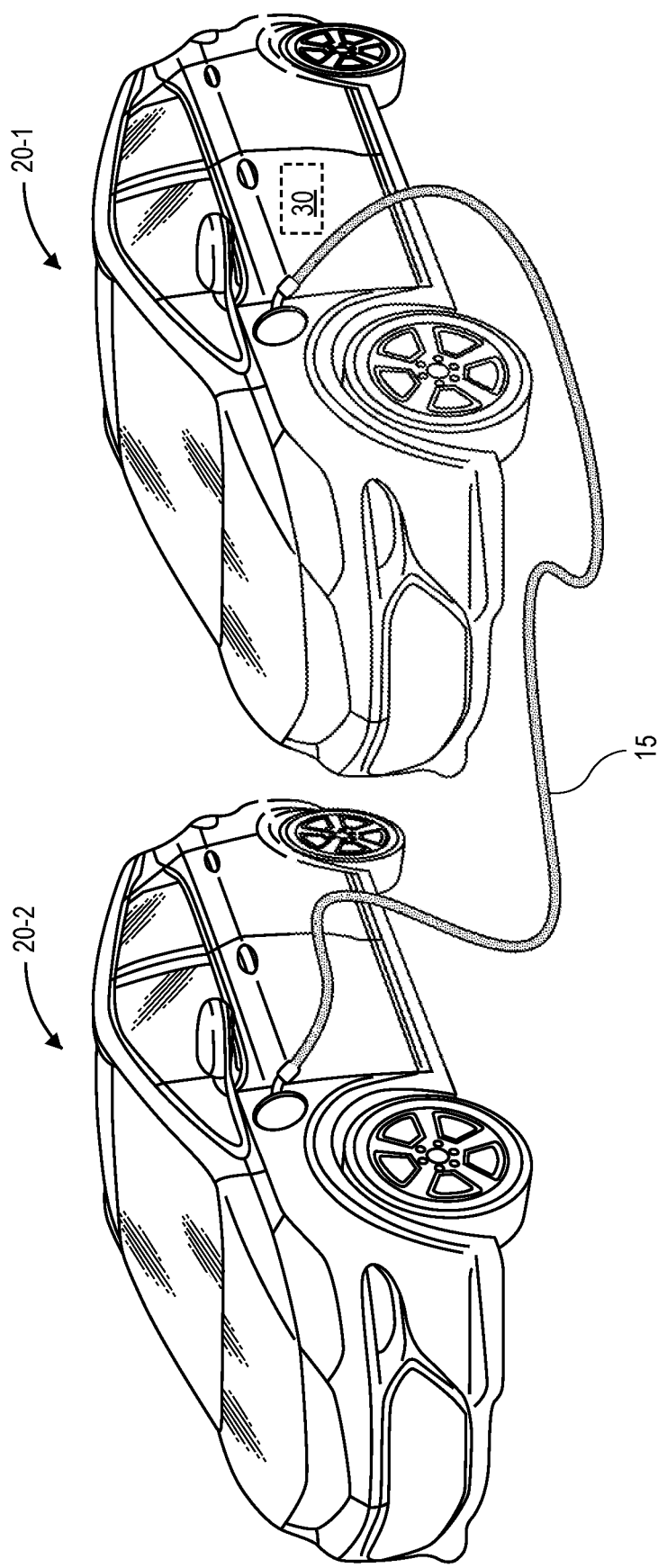
FIG. 1B is a schematic illustration of an example motor vehicle connected to another motor vehicle for vehicle-to-vehicle charging.
Figure 2A:
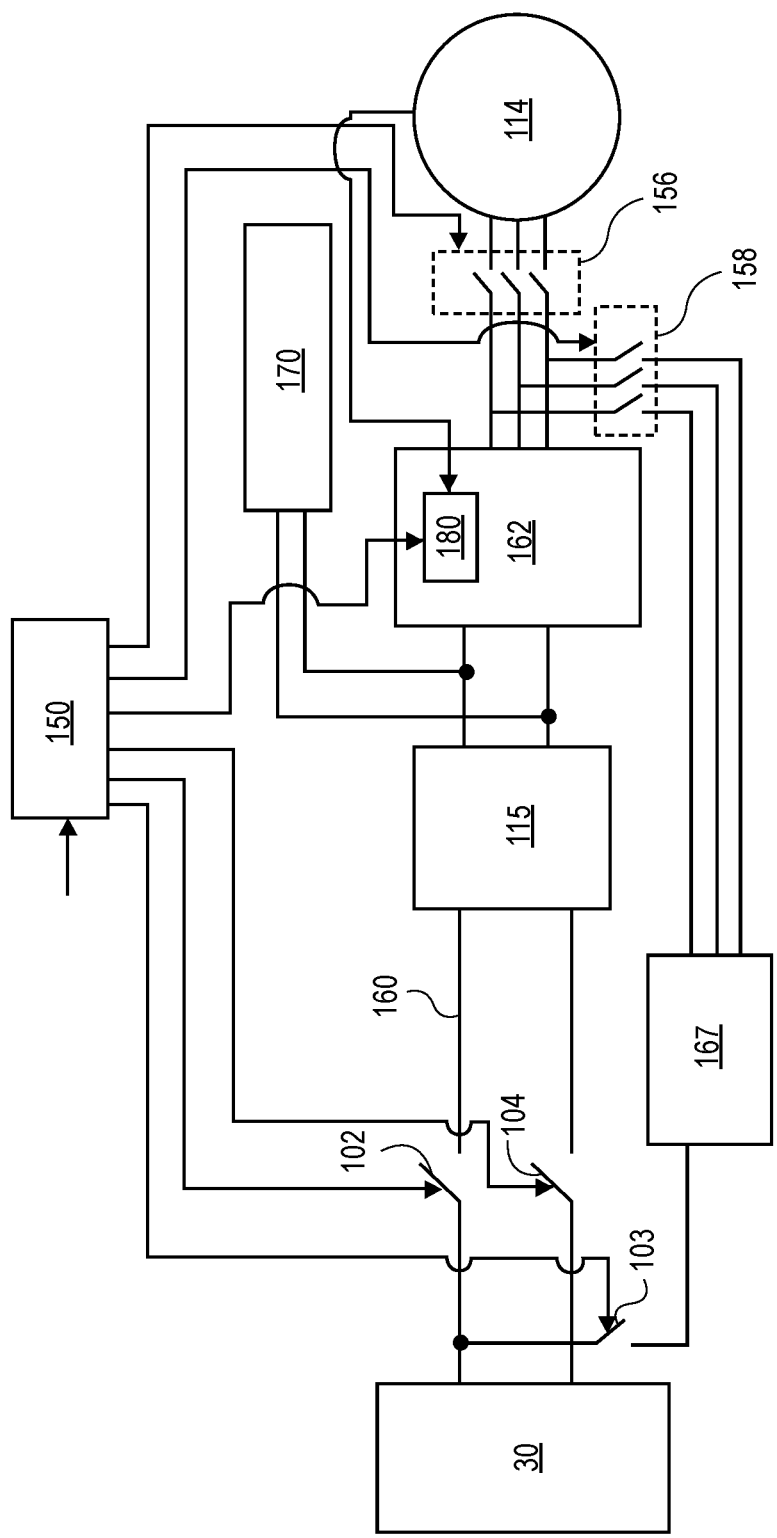
FIG. 2A is a block diagram of an example electrical system according to an example implementation.
Figure 2B:
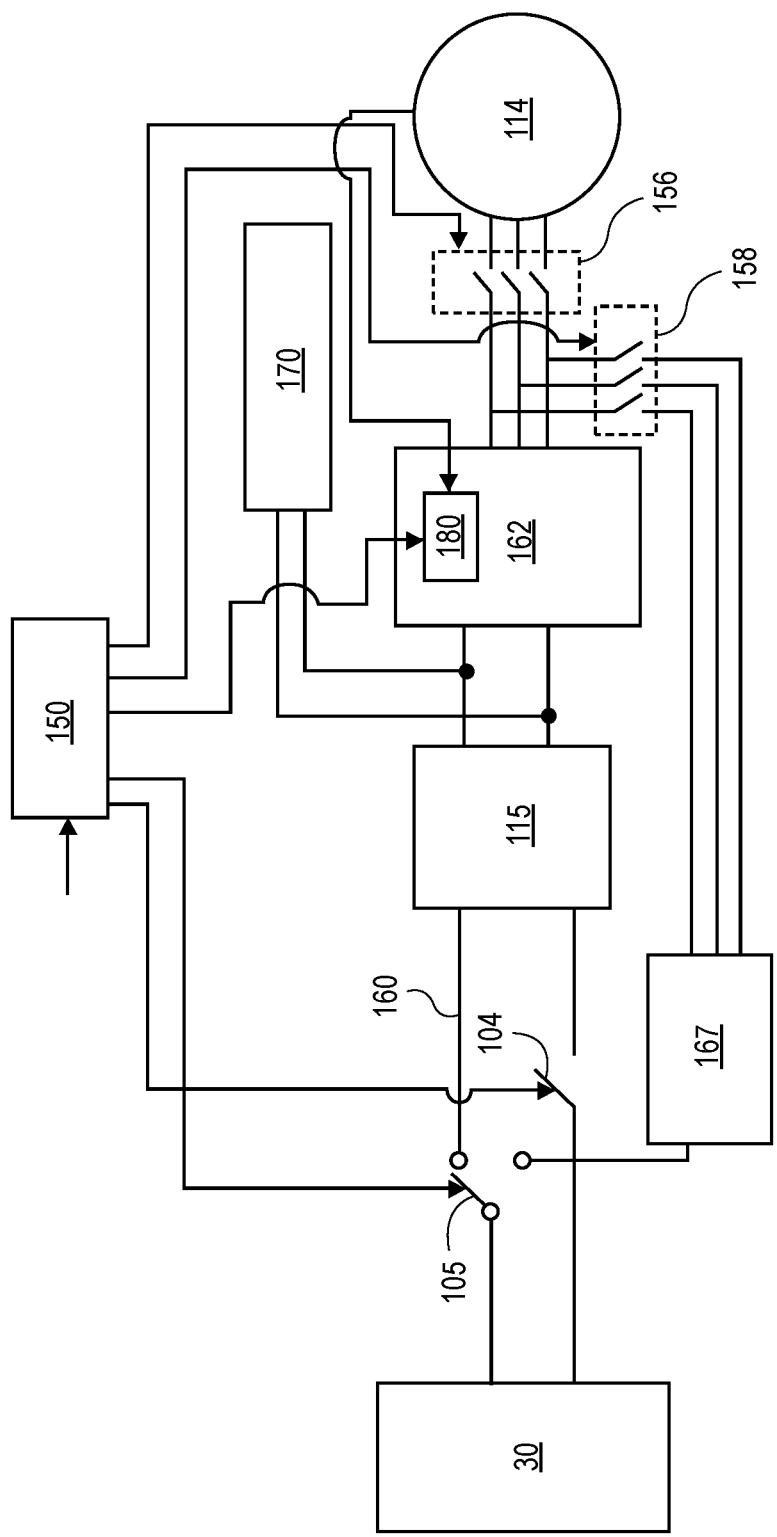
FIG. 2B is a block diagram of an example electrical system according to an example implementation.

The vehicle 20 of FIG. 1A includes a body 12 and drive wheels 14. The body 12 may define or include the charging port 11 at a user-accessible location. The vehicle 20 may be variously embodied as a plug-in electric vehicle having onboard rechargeable energy storage system (RESS) 115 as shown in FIGS. 2A and 2B and described below, e.g., a multi-cell lithium ion, zinc-air, nickel-metal hydride, or lead acid direct current battery pack that can be selectively recharged using the off-board DC fast-charging station 30 of FIG. 1A. The DC charging circuit 10, as best depicted in FIGS. 2A and 2B, incorporates powertrain/traction drive components of the vehicle 20 whose ordinary functions may include powering an electric machine (ME), e.g., a traction motor 114, to generate and deliver motor torque to the drive wheels 14 for propulsion of the vehicle 20, or for performing other useful work aboard the vehicle 20. FIG. 1B illustrates an example implementation of vehicle-to-vehicle (V2V) charging. As shown, a first vehicle 20-1 may be used to at least partially charge a second vehicle 20-2, or vice versa. The first vehicle 20-1 and/or the second vehicle 20-2 may include an electrical system as described herein.

Figure 3:
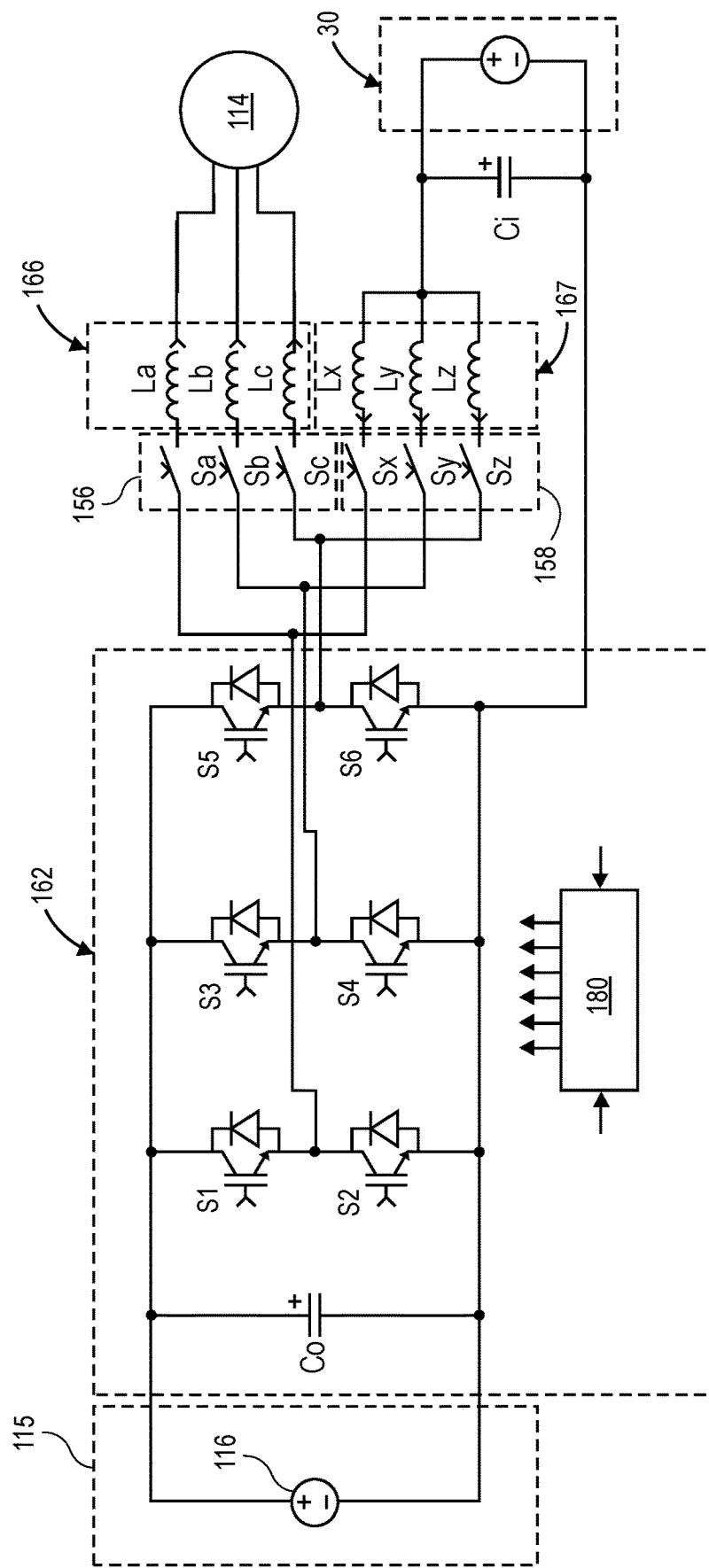
FIG. 3 is a circuit schematic of the example electrical system according to an example implementation.

FIGS. 2A and 2B illustrate a block diagrams of an electrical system 100 for the vehicle 20 according to various implementations. As shown, the electrical system 100 includes the onboard rechargeable energy storage system (RESS) 115 adapted for storing high-voltage electrical energy used for propelling an electric-drive vehicle, such as the vehicle 20 of FIG. 1A. RESS 115 may be a deep-cycle, high-ampere capacity battery system rated for approximately four hundred (400) to approximately eight hundred (800) volts direct current (VDC) or more, for example, depending on a desired vehicle range, gross vehicle weight, and power ratings of the various loads drawing electrical power from the RESS 115 in various implementations. However, it is understood that the RESS 115 may be rated for other voltages as well. A DC link capacitor Co can be connected across positive and negative terminals of the inverter as illustrated in FIG. 3.

The RESS 115 may include one or more high-voltage, independently rechargeable battery packs. The RESS 115 may be connected a high-voltage DC bus bar 160 and a power inverter 162 for governing the transmission of electrical energy to and from the traction motor 114.

The vehicle 20 may further include one or more accessory loads 170. In an example implementation, the accessory loads 170 can comprise various loads that draw electrical power from the electrical system 100. In an example implementation, the RESS 115 may be adapted to store voltage at a first voltage, such as approximately eight hundred (800) VDC. However, an off-board power source, such as the off-board DC fast-charging station 30 or another vehicle, may be configured to supply voltage at a second voltage that is less than the first voltage, such as four hundred (400) VDC. As discussed in greater detail below, the electrical system 100 can be configured to boost a voltage supplied by the off-board power source.

The electrical system 100 further includes a controller 150, a first switch 102, a second switch 103, and a third switch 104 to control a boost DC-DC operation for delivering electrical power to the RESS 115 from the off-board power source. While the off-board power source illustrated comprises a DC fast-charging station 30, it is understood that the off-board power source may also comprise another vehicle.

The switches 102, 103, and 104 may comprise contactors or solid-state relays that are adapted to close under electrical load so as to ensure the instantaneous or near instantaneous delivery of electrical power to the vehicle's propulsion system and to drive any number of in-vehicle accessories. In another example implementation, one or more of the switches 102 and 103 may be replaced with a Single Pole Double Throw (SPDT) switch. In this implementation, the SPDT 105 is controllable by the controller 150 to allow the off-board power source to connect to either the RESS 115 or to a set of inductor windings 167, which is discussed in greater detail below.

The controller 150 can include at least one processor and sufficient memory for storing computer-readable instructions. The memory includes tangible, non-transitory memory, e.g., read only memory, whether optical, magnetic, flash, or otherwise. The controller 150 also includes sufficient amounts of random-access memory, electrically erasable programmable read only memory, and the like, as well as a high-speed clock, analog-to-digital and digital-to-analog circuitry, and input/output circuitry and devices, as well as appropriate signal conditioning and buffer circuitry. The controller 150 can receive charging request signals from one or more electronic control units (ECUs) of the vehicle 20. For example, an ECU associated with the vehicle to charging station or vehicle to vehicle communication system may provide a signal indicating that the RESS 115 needs to be charged from a source that has lower voltage than the RESS voltage, and the controller 150 can initiate the boost DC-DC operation as discussed below. If the DC fast-charging station 30 is capable of directly supplying the required charging voltage for the RESS 115, the switches 102 and 103 can be closed and switch 104 can be open, e.g., the boost mode operation not used.

As shown in FIGS. 2A through 3, the electrical system 100 further includes an inverter controller 180 that controls operation of semiconductor switches S1 through S6 of the power inverter 162, which are described in greater detail below with respect to FIGS. 2A through 3. The inverter controller 180 can include at least one processor and sufficient memory for storing computer-readable instructions. The memory includes tangible, non-transitory memory, e.g., read only memory, whether optical, magnetic, flash, or otherwise. The inverter controller 180 also includes sufficient amounts of random-access memory, electrically erasable programmable read only memory, and the like, as well as a high-speed clock, analog-to-digital and digital-to-analog circuitry, and input/output circuitry and devices, as well as appropriate signal conditioning and buffer circuitry.

In an example implementation, the inverter controller 180 can receive signals from the controller 150 and/or from sensors within the inverter and traction motor 114. For example, the sensors can include phase current sensors and/or rotor position sensors and provide signals indicative of a phase current and/or a position of the rotor, respectively. The inverter controller 180 can control the semiconductor switches S1 through S6 by supplying a signal to one or more gates to cause the semiconductor switches S1 through S6 to transition between an open state and a closed state, as discussed in greater detail below.

FIG. 3 illustrates an example schematic of the electrical system 100. The power inverter 162 can comprise a bidirectional DC-to-AC and AC-to-DC power converter, which may be part of a traction power inverter module (TPIM), that connects the off-board power source, e.g., the off-board DC fast-charging station 30 or another vehicle, to the RESS 115 via inductor windings 167. As shown, the electrical system 100 includes a plurality of machine windings 166 and a plurality of inductor windings 167 that are magnetically decoupled from the machine windings and may be disposed within the inverter or the battery assembly on a heat sink surface therein for cooling.

In an example implementation, the machine windings 166 comprise windings, e.g., machine windings, of the traction motor 114. For example, during vehicle 20 operation, the machine windings 166 can provide three-phase current to create a rotating magnetic field to rotate a rotor of the traction motor 114. While illustrated as including only three machine windings 166, it is understood that the traction motor 114 may include additional machine windings 166 depending on a motor configuration. The power inverter 162 may incorporate multiple phases and respective motor control modules operable to receive motor control commands and control inverter states therefrom for providing motor drive or regenerative functionality. In an example implementation, the machine windings 166 can comprise machine windings La, Lb, Lc.

The inductor windings 167 can comprise multiple inductor windings, illustrated as inductor windings Lx, Ly, Lz in FIG. 3, and can boost a voltage supplied to the RESS 115 via the off-board power source as discussed in greater detail below. In some implementations, the inductor windings Lx, Ly, Lz can be disposed, e.g., wound, around separate magnetic cores. In other implementations, the inductor windings Lx, Ly, Lz can be disposed around a single, e.g., common, magnetic core to mitigate mass and volume within the vehicle 20.

As shown in FIG. 3, the electrical circuit also includes a first set of switches 156 and a second set of switches 158. The first set of switches 170 can include at least a first switch Sa, a second switch Sb, and a third switch Sc. The switches Sa, Sb, and Sc can be disposed between a corresponding machine windings La, Lb, or Lc of the machine windings 166 and the power inverter 162. The switches Sa, Sb, and Sc can be operated by the controller 150 such that electrical energy is provided to the traction motor 114 during vehicle operation and prevent electrical energy from being provided to the traction motor 114 during a charging operation.

The second set of switches 158 can include switches Sx, Sy, Sz and can be disposed between a corresponding inductor winding Lx, Ly, or Lz of the inductor windings 167 and the off-board power source when the off-board power source is connected to the vehicle 20. The switches Sx, Sy, and Sz can be operated by the controller 150 such that electrical energy is provided to the RESS 115 during the charging operation and prevent electrical energy from being provided from the RESS during vehicle operation and/or when the off-board power source is disconnected. In an example implementation, the sets of switches 156 and 158 may comprise contactors, e.g., relays. In an example implementation, the sets of switches 156, 158 may be replaced with Single Pole Double Throw (SPDT) switches.

The power inverter 162 may comprise a set 164 of semiconductor switches S1 through S6 (also referred to herein as "inverter switches") that cooperatively convert direct current (DC) power from the RESS 115 to alternating current (AC) power for powering the traction motor 114 via high frequency switching in a motoring or braking mode. Each semiconductor switch S1 through S6 may be embodied as a voltage-controlled switching device in the form of a silicon insulated gate bipolar transistor (IGBT), a silicon carbide (SiC) metal-oxide semiconductor field effect transistor (MOSFET), a silicon (Si) superjunction MOSFET, a Gallium nitride (GaN) field-effect transistor (FET), a SiC junction-gate field-effect transistor (JFET), other wideband-gap (WBG) or ultra-wideband-gap semiconductor power switching device (UWBG), or other suitable switch having a corresponding gate to which a gate signal is applied to change the on/off state of a given switch. There is typically at least one pair of semiconductor switches for each phase of the three-phase traction motor 114. Each pair of switches, e.g., switches S1 and S2 (Phase A), switches S3 and S4 (Phase B), and switches S5 and S6 (Phase C), may referred to as phase legs of the power inverter 162. For example, the power inverter 162 may include at least three (3) phase legs in an example implementation. Each phase leg of the power inverter 162 is connected to a corresponding machine phase terminal, e.g., one of the machine windings 166.

Referring to FIG. 3, the off-board power source, e.g., charger 30 or another vehicle, can be adapted to provide converted electrical power to the RESS 115 during charging. For example, the electrical system 100 can step up a voltage supplied by the off-board power source. The battery pack 116 may be adapted to store voltage at the first voltage, which is a higher voltage than the second voltage, e.g., the first voltage may be eight hundred (800) VDC and the second voltage may be four hundred (400) VDC. During this operational state, e.g., a charging operation, the switches S1, S3, and S5 may be in an open state to prevent current flow through the corresponding switch. At least one of the switches S2, S4, or S6 may be supplied with pulse width modulated control signal to allow current flow from the off board charging source to the RESS 115. During the boost charging operation, the controller 150 can also cause the corresponding winding, e.g., inductor winding Lx, Ly, or Lz, of the inductor windings 167 as well as the corresponding switch Sx, Sy, or Sz to be in a closed state to complete an electrical connection between the off board charging source and the RESS 115.

The inductances of inductor windings Lx, Ly, Lz and corresponding freewheeling diodes power inverter 162 switches can function as an interleaved three-phase boost converter. It is understood that by using inductor windings that are magnetically decoupled from the machine windings there is no influence on the machine torque as it is disconnected during the boost operation. The controller 150 and/or the inverter controller 180 can select an optimal duty cycle and phase shift of the inverter phases to provide the requested charging current with minimized current ripple during boost converter function. For example, the controller 150 and/or the inverter controller 180 can use a lookup table based on one or more vehicle parameters, e.g., charging current, voltage, etc., and output a PMW signal corresponding to the vehicle parameters to cause the second set of switches 158 and/or one or more inverter switches S1 to S6 to operate as described above. For example, based on the switch selection, a desired boost converter functionality can be selected to charge the RESS 115 and minimize the charging current ripple.

In various implementations, the controller 150 and the inverter controller 180 can modulate control signals provided to the second set of switches 158 and/or the power inverter 162 switches. For example, during a charging operation, control signals can be modulated such that electrical energy is provided to the RESS 115 via inductor winding Lx and switch S1 during a first time period and that electrical energy is provided to the RESS 115 via inductor winding Ly and switch S3 during a second time period, and that electrical energy is provided to the RESS 115 via inductor winding Lz and switch S5 during a third time period. It is understood that the controller 150 may incorporate various control schemes to allow the voltage supplied by the off-board power source to be converted to a higher voltage, e.g., converted from the first voltage to the second voltage.

During a charging operation, energy stored in one of the machine windings Lx, Ly, Lz is transferred to the RESS 115 via a corresponding freewheeling diode of the power inverter switches 162. Thus, the machine phase windings 167 in conjunction with the inverter phase leg switches can increase the first voltage to the second voltage, e.g., perform a boost conversion. In an implementation in which the inverter switches comprise of MOSFETs, the complementary switch in each phase can be turned on when the lower switch is turned off during the boost converter operation to minimize the freewheeling diode losses.

In some implementations, software for the controller 150 may be updated based via over-the-air programming. For example, software updates can be transmitted to the controller 150 via one or more suitable communication networks from a data source, such as an original equipment manufacturer (OEM). The over-the-air updates can provide desired parameters to adjust charging power by adjusting the inverter control signals, e.g., current command, frequency, duty cycle, phase shift, etc., for one or more switches S1 to S6 according to a charging power level via the inverter controller 180.

Figure 4:
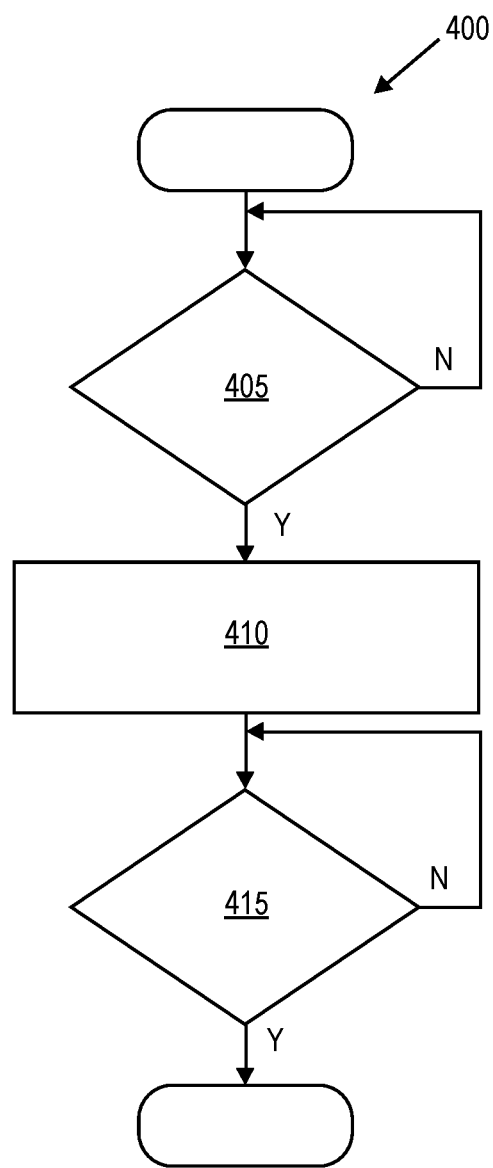
FIG. 4 is a flow chart illustrating an example process for charging a RESS of a vehicle via an off-board power source according to an example implementation.

FIG. 4 is a flowchart of an exemplary process 400 for providing power the RESS 115 of the vehicle 20 via an off-board power source. Blocks of the process 700 can be executed by the controller 150 and/or the inverter controller 180. At block 405, a determination is made whether an electrical connection between an off-board power source and the high-voltage DC bus bar 160 has been established. For example, the controller 150 may receive an input signal indicating a charge initiation through suitable handshake protocols and/or signals with off board power source controller and establishes the electrical connection. If the electrical connection has not been established, the 400 returns to block 405.

If the electrical connection has been established, the controller 150 transmits one or more control signals to the inverter 162, the switches 102, 103, 104, and the first and second sets of switches 156, 158 at block 410. Based on the input from the controller 150, the switches 102, 103, 104, and/or 105 transition to a desired operating state, e.g., the open state or the closed state, and the inverter controller 180 outputs voltage signals that cause the switches S1 through S6 of the inverter 162 to provide the boost function. For example, the switch 102 may be transitioned to the open state to prevent current flow from the off-board power source to the RESS 115, and the switch 103 may be transitioned to the closed state to allow current flow from the off-board power source to the inductor windings 167, e.g., boost inductor windings, to step up the voltage provided to the RESS 115. The switches of the power inverter 162 may be modulated while the corresponding second set of switches 158 are kept closed to increase the voltage at the RESS 115 due to boost converter action of causing current to flow through the inductor windings 167.

At block 415, the controller 150 determines whether the electrical connection between the off-board power source has been disconnected or the RESS charging is completed. For example, the controller 150 can receive a signal indicating the charging cable 15 connector has been disconnected from the charging port 11, or the RESS charging is completed. If the controller 150 has not determined that the electrical connection has been disconnected or the RESS charging is completed, the process 400 returns to block 415. Otherwise, the process 400 ends.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An electrical system, comprising:
   a rechargeable energy storage system (RESS);
   a power inverter connected to the RESS, the power inverter configured to provide electrical power to a traction motor;
   a plurality of machine windings connected between a plurality of first switches and the traction motor, wherein each switch of the plurality of first switches is configured to transition between a closed state to allow current flow between the power inverter and the traction motor and an open state to prevent current flow between the power inverter and the traction motor; and
   a plurality of inductor windings connected between a plurality of second switches and an off-board power source, wherein each switch of the plurality of second switches is configured to transition between a closed state to allow current flow between the off-board power source and the power inverter to charge the RESS and an open state to prevent current flow between the off-board power source and the power inverter.

2. The electrical system of claim 1, wherein each winding of the plurality of machine windings comprise windings of the traction motor.

3. The electrical system of claim 1, wherein each winding of the plurality of inductor windings are disposed about a common magnetic core that is magnetically decoupled from the traction motor.

4. The electrical system of claim 1, wherein each winding of the plurality of inductor windings are disposed about a different magnetic core each of which is magnetically decoupled from the traction motor.

5. The electrical system of claim 1, wherein the power inverter comprises a set of semiconductor switches that are configured to convert direct current (DC) power to alternating current (AC) power.

6. The electrical system of claim 5, wherein each semiconductor switch of the set of semiconductor switches comprises a voltage-controlled switching device.

7. The electrical system of claim 6, wherein the voltage-controlled switching device comprises at least one of a silicon insulated gate bipolar transistor (IGBT), a silicon carbide metal-oxide semiconductor field effect transistor (MOSFET), a silicon superjunction MOSFET, a Gallium nitride (GaN) field-effect transistor (FET), a SiC junction-gate field-effect transistor (JFET), a wideband-gap (WBG) device, or an ultra-wideband-gap device (UWBG).

8. The electrical system of claim 5, the power inverter comprising a plurality of phase legs, each phase leg of the plurality of phase legs comprising a pair of semiconductor switches of the set of semiconductor switches, wherein each phase leg selectively connects to a corresponding machine winding of the plurality of machine windings or a corresponding inductor of the plurality of inductor windings.

9. The electrical system of claim 8, wherein at least one semiconductor switch of a at least one phase leg is pulse-width modulated to allow current flow through at least one of the phase leg and corresponding inductor winding to the RESS from the off-board power source.

10. The electrical system of claim 9, wherein current flows through at least one inductor winding of the plurality of inductor windings to increase a voltage from the off-board power source from a first voltage to a second voltage.

11. An electrical system, comprising:
    a rechargeable energy storage system (RESS);
    a power inverter connected to the RESS, the power inverter configured to provide electrical power to a traction motor;
    a plurality of machine windings connected between a plurality of first switches and the traction motor, wherein each switch of the plurality of first switches is configured to transition between a closed state to allow current flow between the power inverter and the traction motor and an open state to prevent current flow between the power inverter and the traction motor;
    a plurality of inductor windings connected between a plurality of second switches and an off-board power source, wherein each switch of the plurality of second switches is configured to transition between a closed state to allow current flow between the off-board power source and the power inverter to charge the RESS and an open state to prevent current flow between the off-board power source and the power inverter; and
    a controller connected to the plurality of first switches, the plurality of second switches, a power inverter controller, wherein the controller is configured to transmit control signals to the plurality of first switches, the plurality of second switches, and the power inverter controller to allow current flow between the off-board power source and the power inverter to charge the RESS during a charging operation.

12. The electrical system of claim 11, wherein each winding of the plurality of machine windings comprise windings of the traction motor.

13. The electrical system of claim 11, wherein each winding of the plurality of inductor windings are disposed about a common magnetic core.

14. The electrical system of claim 11, wherein each winding of the plurality of inductor windings are disposed about a different magnetic core.

15. The electrical system of claim 11, wherein the power inverter comprises a set of semiconductor switches that are configured to convert direct current (DC) power to alternating current (AC) power, wherein each semiconductor switch of the set of semiconductor switches comprises a voltage-controlled switching device, wherein the voltage-controlled switching device comprises at least one of a silicon insulated gate bipolar transistor (IGBT), a silicon carbide metal-oxide semiconductor field effect transistor (MOSFET), a silicon superjunction MOSFET, a Gallium nitride (GaN) field-effect transistor (FET), a SiC junction-gate field-effect transistor (JFET), a wideband-gap (WBG) device, or an ultra-wideband-gap device (UWBG).

16. The electrical system of claim 15, the power inverter comprising a plurality of phase legs, each phase leg of the plurality of phase legs comprising a pair of semiconductor switches of the set of semiconductor switches, wherein each phase leg selectively connects to a corresponding machine winding of the plurality of machine windings or a corresponding inductor of the plurality of inductor windings.

17. The electrical system of claim 11, wherein the controller receives software updates via over-the-air programming.

18. The electrical system of claim 11, wherein the controller is configured to transmit control signals to control the current flow to achieve a desired charging power in boost converter mode.

19. A method comprising:
    determining whether a connection with an off-board power source has been established; and
    transmitting at least one control signal to a power inverter and to at least a first switch to prevent current flow between the power inverter and a plurality of machine windings of a traction motor and to at least a second switch to allow current flow between the off-board power source through a plurality of inductor windings to a rechargeable energy storage system (RESS) during a charging operation.

20. The method as recited in claim 19, wherein the plurality of inductor windings and the plurality of switches at an output of the power inverter are disposed within at least one of the RESS or the power inverter.

* * * * *